Figure 1:
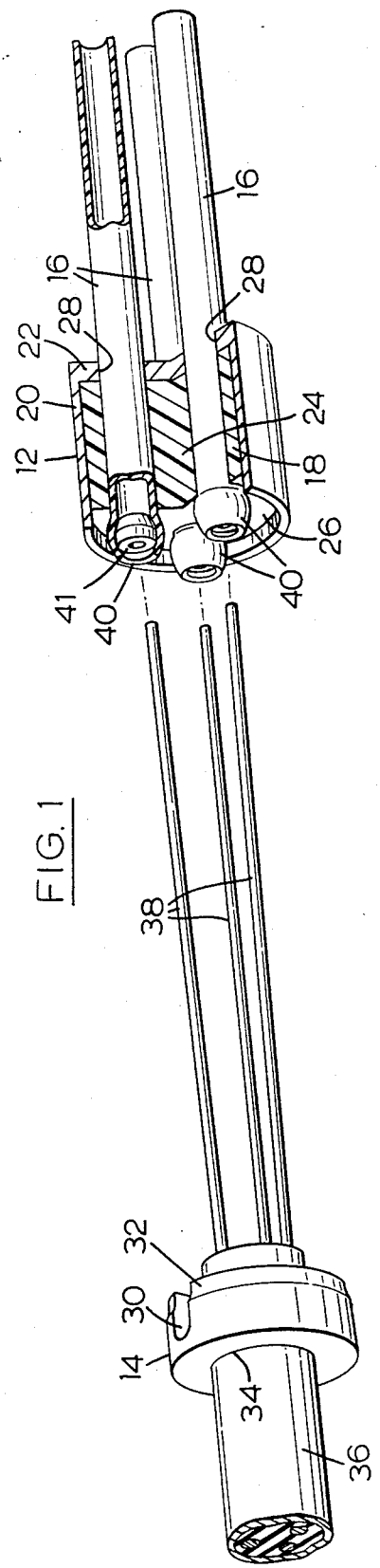

United States Patent [19]

Howie et al.

[11] 3,764,728

[45] Oct. 9, 1973

[54] END SEALS FOR ELECTRIC CABLES AND METHOD OF MAKING SAME

[75] Inventors: David Malcolm Howie, Carrying Place, Ontario; Roy Victor William McKenzie, Belleville, Ontario, both of Canada

[73] Assignee: Pyrotenax of Canada Limited, Trenton, Ontario, Canada

[22] Filed: Apr. 17, 1972

[21] Appl. No.: 244,752

[30] Foreign Application Priority Data

Feb. 25, 1972 Canada................................ 135,604

[52] U.S. Cl..................... 174/76, 29/624, 174/77 R
[51] Int. Cl. ........................ H02g 15/04, H02g 1/14
[58] Field of Search........................... 174/76, 77 R; 29/624, 628, 630 R, 630 A

[56] References Cited
FOREIGN PATENTS OR APPLICATIONS
481,855   3/1952   Canada.............................. 174/77 R
1,140,740   1/1969   Great Britain....................... 174/76

1,174,759   12/1969   Great Britain....................... 174/76

*Primary Examiner*—Laramie E. Askin
*Attorney*—Roy Harold

[57] ABSTRACT

An improved seal for a metal sheet cable according to the present invention includes a clamping ring which may be positioned in the clamping engagement with respect to the pot member in response to movement of the clamping ring in a direction towards the exposed end of the cable to which it is to be clamped. The method of forming the end seal according to the present invention includes the steps of locating the clamping ring in a position spaced inwardly from the exposed end of the cable to which it is to be clamped, positioning the primary input passage of the pot member on the end of the cable and moving the clamping ring in a direction towards the exposed end of the cable so as to be positioned in the annular passage formed between the pot member and the cable in clamping engagement with the pot member and the cable.

2 Claims, 3 Drawing Figures

PATENTED OCT 9 1973　　3,764,728

END SEALS FOR ELECTRIC CABLES AND METHOD OF MAKING SAME

This invention relates to improvements in seals for metal sheathed cables. In particular, this invention relates to an improved end seal and a method of operably locating the end seal on a metal sheathed cable by means of a deformable clamping ring.

Considerable difficulty has been experienced in attempting to provide an effective end seal for electrical cables, such as the mineral insulated cables which have a metal sheath filled or packed with insulating material. Generally the end seal is formed by means of a pot which has an insulating chamber therein and which is secured to the end of the metal sheath by threading the pot directly onto the end of the metal sheath. A typical example of this construction is shown in British Patent No. 645,797. The principal disadvantage of this construction is the number of steps in the operation of installing these end seals.

Generally, a kit is provided for use in forming the end seals which consists of a pot, a package containing a supply of insulating material and a number of core insulating sleeves and an end wall sealing member. When in use, the pot is threaded on to the end of a sheath, the insulating chamber of the pot is packaged with an insulating material, the cores are covered, at least in part, by the insulating sleeves and the end wall is located within the open end of the pot. The end of the pot is then sealed by folding the ends of the pot inwardly over the end seal. There are a number of other relative constructions in which the pot is filled with the insulating material. One of the principal disadvantages of this method is that it is necessary for the installation mechanic to locate the insulating material in the insulting pot. When the mechanic is forming an end seal he has generally just cut the sheath of the cable by means of a saw to expose the core members. The mechanic's hands are likely to be covered with small particles of metal from the sheath which are transferred to the insulating material when the insulating material is being transferred from its storage package to the insulating chamber. It has been found that the efficiency of operation of the insulating material can be undesirably affected by the presence of the small particles picked up from the mechanic's hands.

The present invention overcomes the difficulties of the prior art described above and provides an improved end seal for metal sheathed cables and the like which is inexpensive to manufacture and simple and efficient to install. The present invention also provides an improved method of installing an end seal for a metal sheathed cable which considerably reduces the likelihood of contamination of the insulation.

According to an embodiment of the present invention, an end seal for a metal sheathed cable having at least one core member comprises a pot member having an inner end and an outer end, an insulating chamber formed therein, a deformable clamping ring and insulating sleeve means for insulating the core member. The pot member has a primary passage which opens into the insulating chamber and secondary passage means which open outwardly from the insulating chamber. The primary passage means has a diameter which is substantially larger than the diameter of the sheathed cable so as to define an annular passage therebetween. The deformable clamping ring is proportioned to be deformed into a close fitting clamping and sealing relationship with respect to the pot and cable when the clamping ring is forced into said annular passage in a direction from the inner end towards the outer end thereof. The insulating sleeve member extends outwardly through the secondary passage means to receive the core member of the cable in use.

According to a further embodiment of the present invention, there is provided a method of forming an end seal in a metal sheathed cable by means of a pot member and deformable clamping ring as defined above, wherein the insulating sleeve is located in the first position with one end adjacent the primary passage of the insulating chamber and the other end extending outwardly from the secondary passage, and a supply of insulating material is pre-packed into the insulating chamber. The deformable clamping ring is positioned over the sheath and the core member is located within a sleeve. The sleeve is withdrawn from its first position inwardly of the pot into the insulating chamber. The pot member and deformable clamping ring are drawn together so that the deformable clamping ring is forced into the annular passage formed between the pot and the sheathed cable so as to rigidly clamp the pot relative to the sheathed cable and to seal the insulating material within the insulating chamber.

Figure 2:
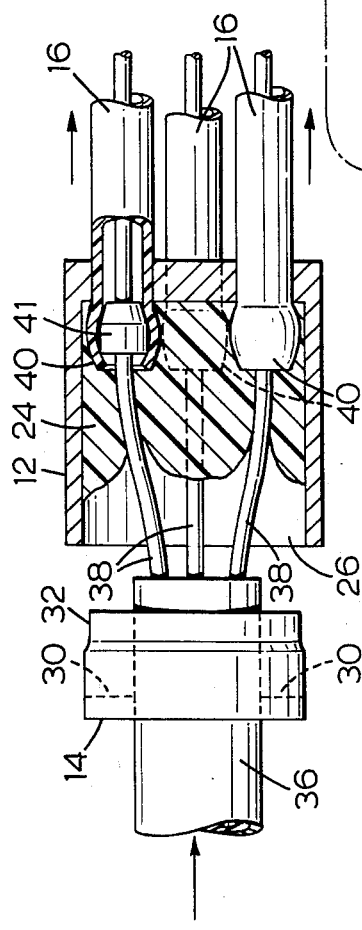
Figure 3:
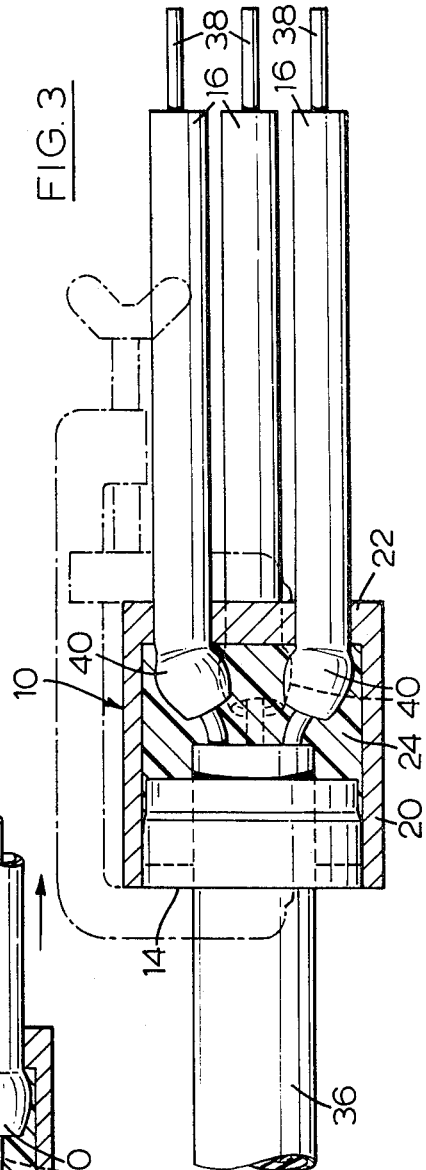

The invention will be more clearly understood after reference to the following detailed specification read in conjunction with the drawings, wherein FIG. 1 is a partial section pictorial view of the first step in the assembly of an end seal according to the present invention;

FIG. 2 is a partial section view similar to FIG. 1 showing a further stage in the assembly of the end seal, and FIG. 3 is a partially sectioned side view of an assembled end seal according to embodiments of the present invention.

In FIG. 3 of the drawings the reference numeral 10 refers generally to an assembled end seal according to an embodiment of the present invention. The seal consists of a pot member 12, a clamping ring 14, insulating sleeves 16 and insulating material 18. The pot 12 has a cylindrical side wall 20 and a transverse end wall 22. The cylindrical wall 20 defines an insulating chamber 24, which has a primary input passage 26 at the inner end thereof and a plurality of secondary passages 28 at the outer end thereof. The clamping ring 14 has a pair of slots 30 extending inwardly from one end thereof. The forward end of the clamping ring 14 is formed with a tapered shoulder 32 so as to facilitate fitting of the clamping ring within the open end of the pot 12. The bore 34 of the clamping ring is adapted to fit in a close fitting relationship over the external diameter of a conventional metal sheathed cable 36.

In the embodiment illustrated in FIG. 1 the cable 36 has three core members 38. The cable 36 may be a conventional mineral insulated cable having a metal sheath wherein the mineral insulation is in the form of magnesium oxide which would absorb water if not properly sealed.

The sleeves 16 are adapted to fit in a close fitting sliding relationship within the passages 28 formed in the end wall 22. Each sleeve 16 has an enlarged head portion 40 at its inner end which is fitted with a retainer ring 41 which will not permit the head portion 40 to pass through the passage 28 when a core 38 is located therein. The sleeves 16, preferably made from a plastic material, are suitably covered to identify the core member.

The insulating material is preferably in the form of a plastic sealing compound, such as Bitulac/C136, which is produced by Bitulac Limited, of England or a similar sealing compound.

The pot 12 and clamping ring 14 may be made from aluminum, brass or a plastic material, such as polypropylene, or the like. The sleeves 16 are preferably made from a plastic material, such as polyvinylchloride or the like.

When the end seal is to be used, a portion of the metal sheath 36 and the insulation is removed to expose the core elements 38. The clamping ring 14 is located in the position shown in FIG. 1 adjacent the end of the sheath 36. An important feature of the present invention is ullustrated in the arrangement of sleeves 16 and insulating material 18 which is illustrated in FIG. 1 of the drawings. It will be noted that the sleeves 16 are initially located in a position wherein their open ends are located adjacent the primary input passage of the insulating chamber so as to be spaced outwardly from the insulating material. In this position the ends of the bores of the sleeves are exposed so that the core elements 38 may be very easily threaded into the bores of the sleeves 16 to the position shown in FIG. 1 of the drawings.

The sleeves 16 are then withdrawn to the position in FIG. 2 of the drawings wherein the enlarged shoulders 40 are located closely adjacent the end wall 22 of the housing.

The pot member is then moved towards the end of the sheath so that the end of the sheath is located within the insulating chamber, as shown in FIG. 2 of the drawings. The movement of the end of the cable into the insulating chamber serves to compress the insulating material to fill the cavities created by withdrawing the sleeves through the body of the plastic material so as to ensure the insulating material is in intimate contact with the cores. The tapered end 32 of the ring 14 facilitates the entry of the ring into the primary passage of the pot. When the clamping ring has been initially positioned in the open end of the pot, a suitable clamping tool is applied to engage the clamping ring and the pot to move the clamping ring into the open end of the pot. As the clamping ring is forced into the primary input passage of the pot it is compressed radially inwardly and the slots 30 permit the forward end of the clamping ring to be inwardly compressed into clamping engagement with the sheath 36. The clamping ring 14 is of a sufficient external diameter to provide an interference fit in the primary input passage 26 of the pot 12 so that when the clamping ring is positioned as shown in FIG. 3 of the drawings it is rigidly secured with respect to the sheath 36 and the pot 12. This method of mounting the end seal is simple and effective, and by providing an end seal pot with the sleeves retained in the position shown in FIG. 1 by pre-packing the insulating chamber with insulating material, a very simple method of mounting the end seal is provided. Furthermore with the method of the present invention the insulating material is located in its operative position within the insulating chamber of the pot in a controlled production process and not by the installation mechanic. As a result the mechanic will not contaminate the insulating material with cuttings, as has previously occurred, due to the fact that it was necessary for the mechanic to actually handle the plastic material. The simplicity of the clamping ring structure is such that it is possible to achieve an effective clamping to the sheath of the cable and the insulating pot without relying upon threaded connection, which are subject to failure. Furthermore, by forming the slots which extend into the clamping ring from the inner face so as to terminate short of the outer face, it is possible to obtain the required compression without interrupting the sealing efficiency of the outer end face of the clamping ring.

Various modifications of the present invention will be apparent to those skilled in the art without departing from the scope of the invention. It will be apparent that while the cable illustrated in the present invention has three core elements in FIGS. 1 and 2 and three elements in FIG. 3, the number of core elements may be varied substantially according to the type of cable which is to be insulated and the insulating pot will have an appropriate number of passages and sleeves.

The embodiments of the invention in which an exclusive property or privilege is claimed are defined as follows:

1. A sealed cable comprising:
   a. a metal sheathed cable having at least one exposed core member projecting outwardly from one end thereof,
   b. a one-piece sealing pot member having an insulating chamber formed therein,
   c. an end wall at one end of said chamber substantially closing said one end of said chamber,
   d. primary passage means opening into said chamber at the other end of said chamber,
   e. said primary passage means having a diameter at the outer end of said other end of said pot which is at least equal to the maximum diameter of said primary passage over the full length of said primary passage,
   f. said primary passage having a minimum diameter which is substantially larger than the diameter of said sheathed cable,
   g. a clamping ring disposed within said primary passage means,
   h. said clamping ring having an external surface in clamping engagement with said primary passage of said pot and an internal surface in clamping engagement with said cable adjacent said one end of said cable,
   i. secondary passage means opening outwardly from said insulating chamber through said end wall,
   k. insulating sleeve means extending through said secondary passage means,
   l. a core member of said cable extending through said sleeve means,
   m. insulating material filling the remainder of said insulating chamber.

2. A method of forming an end seal for a metal sheathed cable having at least one core member wherein the seal includes a pot member having an inner end and an outer end and an insulating chamber formed therein and a primary passage opening into the insulating chamber at the inner end of said pot member, the primary passage having a diameter substantially larger than the diameter of the sheathed cable so as to define an annular passage therebetween in use, a deformable clamping ring proportioned to provide an interference fit within said annular passage in response to movement of said clamping ring into said primary passage in a direction from said inner end towards said outer end, a secondary passage means opening outwardly from the insulating chamber at the outer end of said pot member, insulating sleeve means extending through the secondary passage means for receiving a core member of said cable, and insulating material in said insulating chamber, comprising the steps of (a) initially locating the insulating sleeve means in a position wherein it extends through the insulating material to a position disposed outwardly from the insulating chamber in the area of the primary passage, (b) locating the clamping ring in a position on the sheathed cable spaced inwardly from one end of the cable, (c) threading a core member of the cable into said insulating sleeve means, (d) withdrawing the insulating sleeve means and its associated core member from said first position through the body of the insulating material to a second position disposed within the insulating material and more closely adjacent the secondary passage means, (e) locating the end of the sheathed cable within said primary passage to define an annular passage between said cable and said pot member, (f) forcing said clamping ring member into said annular passage in a direction towards the outer end of the pot member so as to clamp and seal said cable with respect to said pot member and simultaneously press the insulating material into the cavity created by withdrawing the insulating sleeve means therethrough.

* * * * *